(No Model.)
M. L. SENDERLING.
HUB FOR VEHICLE WHEELS.
No. 277,355. Patented May 8, 1883.
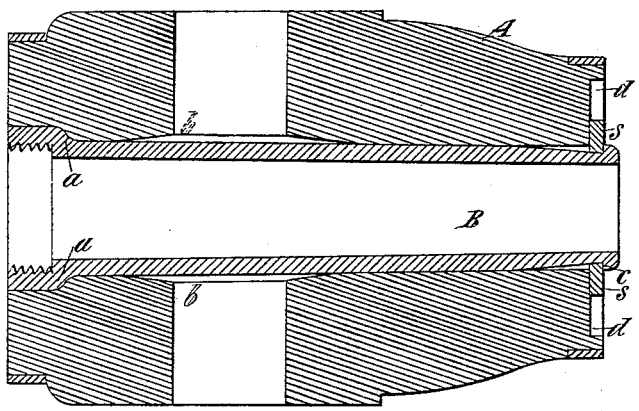
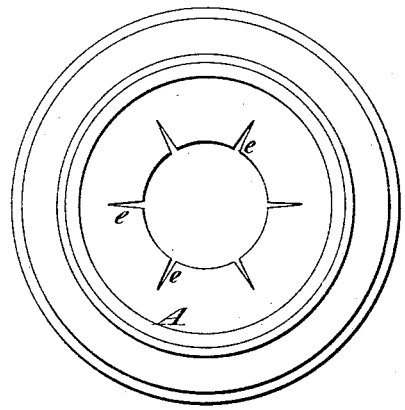
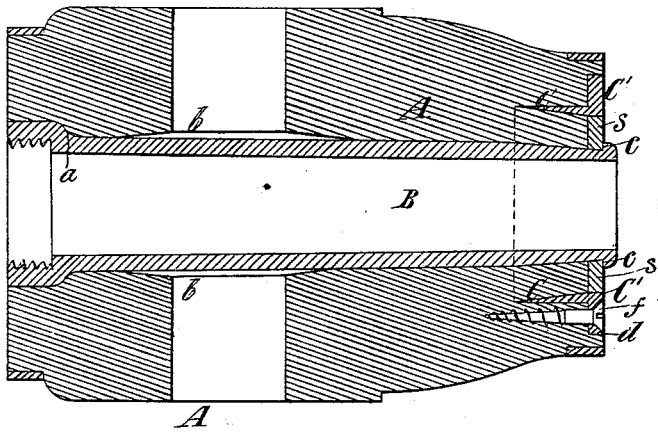
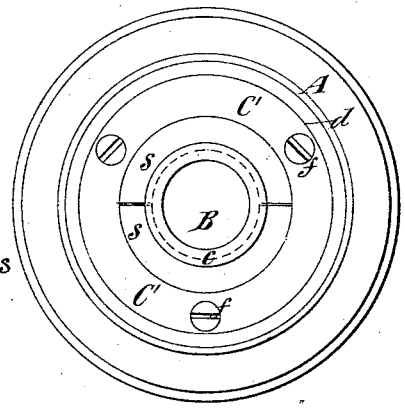
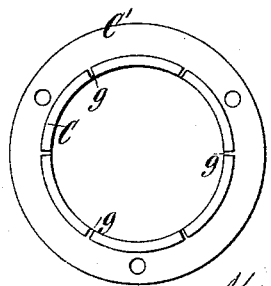
Witnesses:
Inventor:
Martin L. Senderling
by his Attorneys
Brown & Brown
N. PETERS, Photo-Lithographer, Washington, D. C.

United States Patent Office.

MARTIN L. SENDERLING, OF JERSEY CITY, NEW JERSEY.

HUB FOR VEHICLE-WHEELS.

SPECIFICATION forming part of Letters Patent No. 277,355, dated May 8, 1883.

Application filed December 18, 1882. (No model.)

*To all whom it may concern:*

Be it known that I, MARTIN L. SENDERLING, of Jersey City, in the county of Hudson and State of New Jersey, have invented a new and useful Improvement in Securing Axle-Boxes in Hubs, of which the following is a specification.

Axle-boxes commonly have a shoulder at their inner ends, and after the box has been inserted in the hub, from the inner end thereof, wedges are driven into the outer and inner ends of the hub to bind it upon the box.

The object of my invention is to provide for more securely fastening or fixing the boxes in wheel-hubs; and to this end the invention consists in the combination, with an axle-box having an external projection, shoulder, or flange at its outer end, of a hub which is wedged at the outer end, so as to contract it about the axle-box behind said projection, shoulder, or flange, and which therefore holds the box securely against displacement.

The invention also consists in the combination, with an axle-box having an external shoulder at its outer end, of a sectional ring or flange placed against said shoulder, and a hub wedged at the outer end, so as to contract it about the axle-box behind said sectional ring or flange.

The invention also consists in the combination, with the axle-box above described and the hub, of a metallic wedge of novel construction for contracting the hub, as hereinafter described.

In the accompanying drawings, Figure 1 represents a longitudinal section of an axle-box and hub embodying my invention before the hub is contracted by wedging. Fig. 2 represents a view of the outer end of the hub. Fig. 3 represents a longitudinal section of the box and hub after the wedging is completed. Fig. 4 represents an end view of the complete hub, and Fig. 5 represents a view of the inner side of the metallic wedge.

Similar letters of reference designate corresponding parts in all the figures.

A designates the hub, and B the axle-box, which is provided with the usual shoulder, $a$, at its inner end, and is or may be provided with the usual fins, $b$, extending longitudinally of the exterior.

At the outer end of the axle-box is an external projection, shoulder, or flange, $c$, which, as here shown, extends continuously circumferentially around the box, but which might consist of several lugs or projections isolated from each other. Such lugs or projections would, however, constitute a shoulder or sectional flange.

In the present example of my invention a ring, $s\ s$, composed of two or more sections, is placed behind and against the shoulder or flange $c$. The hub is bored out large enough to admit the projection or flange $c$ through it, and is scored at $e$ to the circle on which the wedges are to be driven. After the box is inserted in place in the hub the ring or flange $s\ s$ is placed on the box, and the hub is wedged to contract it around the box immediately back of the said ring or flange. The rings might be dispensed with, in which case the end of the hub would come directly against the shoulder $c$. The hub then holds the box by a shoulder at each end, and the latter cannot by any possibility get loose.

For wedging the hub I may use ordinary wooden wedges; but I prefer to use a circular wedge, C, projecting inward from a flange or ring, C', which fits in or on the outer end of the hub in a rabbet, $d$, and which, after the wedge is driven in, may be secured by screws $f$ or otherwise. The flange-ring C' fits snugly around the sectional ring $s$ and holds its sections together. The circular wedge C may be divided or notched at $g$, opposite the scoring $e$, and its outer side should be cylindric and the bevel all on the inner side, so that when driven in it will have no tendency to expand the hub.

The wedge C can be easily removed at any time and a new box applied to the hub, if desired.

It will be seen that my invention adds but little, if anything, to the cost of securing axle-boxes in wheel-hubs, and that by it greater security is afforded and the boxes are prevented from getting loose.

What I claim as my invention, and desire to secure by Letters Patent, is—

1. The combination, with an axle-box having an external projection, shoulder, or flange at its outer end, of a hub which is wedged at the outer end, so as to contract it about the axle-box behind said projection, shoulder, or flange, substantially as and for the purpose herein described.

2. The combination, with the box B, provided with the projection or flange $c$, of the hub A, scored at $e$, and wedged to contract it about the box behind said projection or flange, substantially as and for the purpose described.

3. The combination, with an axle-box provided at the outer end with an external shoulder, of a sectional ring or flange placed against said shoulder, and a hub wedged to contract it about said box behind the ring or flange, substantially as and for the purpose described.

4. The combination, with an axle-box provided at the outer end with an external projection or flange, of a hub fitting said box, and a circular metallic wedge for contracting the hub about the axle-box behind said projection or flange, and which is provided with a ring or cap secured to the outer end of said hub, substantially as and for the purpose described.

5. The combination of the box B, having the shoulder $c$, the sectional ring $s$, the hub A, and the circular metallic wedge C, provided with the ring C', surrounding the sectional ring $s$, substantially as specified.

MARTIN L. SENDERLING.

Witnesses:
 FREDK. HAYNES,
 ED. L. MORAN.